(12) United States Patent
Hagberg

(10) Patent No.: US 11,701,724 B2
(45) Date of Patent: Jul. 18, 2023

(54) CUTTING BLADE AND METHOD FOR PRODUCING SUCH A BLADE

(71) Applicant: HUSQVARNA AB, Huskvarna (SE)

(72) Inventor: Albin Hagberg, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 402 days.

(21) Appl. No.: 16/616,140

(22) PCT Filed: Apr. 20, 2018

(86) PCT No.: PCT/SE2018/050402
§ 371 (c)(1),
(2) Date: Nov. 22, 2019

(87) PCT Pub. No.: WO2018/194511
PCT Pub. Date: Oct. 25, 2018

(65) Prior Publication Data
US 2021/0291285 A1    Sep. 23, 2021

(30) Foreign Application Priority Data

Apr. 21, 2017  (SE) .................... 1750469-7

(51) Int. Cl.
*B23D 61/02* (2006.01)
*B23D 65/00* (2006.01)

(52) U.S. Cl.
CPC .......... *B23D 61/025* (2013.01); *B23D 65/00* (2013.01)

(58) Field of Classification Search
CPC .... B23D 61/02; B23D 61/021; B23D 61/025; B23D 65/00

USPC .......................................... 83/835
See application file for complete search history.

(56) References Cited

U.S. PATENT DOCUMENTS

| 3,592,703 | A |   | 7/1971  | Dehn et al. |
| 3,682,032 | A | * | 8/1972  | Pfeiffer ................ B26D 7/2635 83/676 |
| 3,712,348 | A | * | 1/1973  | Kulik ...................... B27B 33/04 30/388 |
| 3,736,828 | A |   | 6/1973  | Funakubo |
| 4,784,033 | A | * | 11/1988 | Hayden .................. B23D 61/14 83/835 |
| 4,829,854 | A | * | 5/1989  | Kammerling-Essmann ................ B26F 1/44 83/697 |

(Continued)

FOREIGN PATENT DOCUMENTS

| CA | 1041881 A    | 11/1978 |
| CA | 2 662 894 A1 | 7/2009  |

(Continued)

OTHER PUBLICATIONS

A translation of PL-215272-B1 (Year: 2023).*

(Continued)

*Primary Examiner* — Nhat Chieu Q Do
(74) *Attorney, Agent, or Firm* — Burr & Forman LLP

(57) ABSTRACT

A cutting blade for a clearing saw includes a plurality of teeth, with at least some of the teeth having a leading edge, a trailing edge, and a point in between the leading and trailing edges. The trailing edge can be hardened to a depth in the range 0.02-1.5 mm, and the leading edge may be left unhardened to provide a cutting blade with increased durability and efficiency, that can still be filed manually to remain sharp.

9 Claims, 3 Drawing Sheets

(56) References Cited

U.S. PATENT DOCUMENTS

| | | | | |
|---|---|---|---|---|
| 5,018,421 | A | * | 5/1991 | Lucki ............... B23D 61/12 83/835 |
| 5,417,777 | A | * | 5/1995 | Henderer ............ C22C 38/46 148/334 |
| 5,713,259 | A | * | 2/1998 | Haanschoten ......... B27G 19/02 83/835 |
| 6,883,412 | B1 | * | 4/2005 | Turfitt ............... B23D 61/14 83/835 |
| 2008/0072411 | A1 | * | 3/2008 | Ahorner ............ B23D 61/12 29/415 |
| 2017/0106459 | A1 | | 4/2017 | Haas |

FOREIGN PATENT DOCUMENTS

| | | | |
|---|---|---|---|
| CN | 1086547 A | * | 5/1994 |
| CN | 201586791 U | | 9/2010 |
| DE | 20 2006 008 127 U1 | | 7/2006 |
| DE | 10 2006 007 616 A1 | | 8/2007 |
| EP | 0 908 530 A1 | | 4/1999 |
| FR | 2 284 408 A1 | | 4/1976 |
| JP | 2003-147437 A | | 5/2003 |
| JP | 4867341 B2 | | 2/2012 |
| JP | 4957890 B2 | | 6/2012 |
| JP | 5582386 B2 | | 9/2014 |
| KR | 10-2012-0107163 A | | 10/2012 |
| PL | 215272 B1 | * | 11/2013 |
| WO | 2014/007698 A1 | | 1/2014 |

OTHER PUBLICATIONS

Sweden Search Report dated Nov. 27, 2017 as received in Application No. 1750469-7.

International Search Report and Written Opinion in International patent application No. PCT/SE2018/050402, dated Jul. 13, 2018.

* cited by examiner

CUTTING BLADE AND METHOD FOR PRODUCING SUCH A BLADE

FIELD OF THE INVENTION

The present disclosure relates to a cutting blade for a clearing saw, the cutting blade comprising a plurality of teeth.

The disclosure also relates to a process for producing such cutting blades.

TECHNICAL BACKGROUND

A clearing saw with such a cutting blade is shown for instance in WO-2014/007698-A1. A general problem with such cutting blades is how to increase their durability and efficiency.

SUMMARY OF THE INVENTION

One object of the present disclosure is therefore to provide a clearing saw cutting blade with improved durability. This object is achieved by means of a cutting blade as defined in claim 1. More specifically, in a cutting blade of the initially mention kind, at least some of the cutting blade teeth comprise a leading edge, a trailing edge, and a point in between the leading edge and the trailing edge. The trailing edge is hardened to a depth in the range 0.02-1.5 mm, and the leading edge is left unhardened except at the point. At the point, some hardening of the trailing edge bleeds through, such that the point becomes more durable.

This hardening scheme provides a clearing saw blade with teeth that can be filed at the leading edge while maintaining a hardened tip and trailing edge. This provides a more efficient and durable blade.

More particularly, the trailing edge may be hardened to a depth in the range 0.02-0.5 mm.

The leading edge of a tooth may be concave and face the blade's dedicated circumferential direction of rotation. This shape allows the teeth to be filed with e.g. a 5.5 mm round file.

The cutting blade teeth may be separated by intervening cut-outs. This allows the teeth to comprise bends where they may be directed out of the plane of interior parts of the blade. i.e. to be set.

The present disclosure also relates to a corresponding method for producing a cutting blade for a clearing saw, where the cutting blade comprises a plurality of teeth. The method includes providing at least some of the teeth with a leading edge, a trailing edge, and a point in between the leading edge and the trailing edge, hardening the trailing edge to a depth in the range 0.02-1.5 mm, and leaving the leading edge unhardened except at said point.

The trailing edge may be hardened inductively, which simplifies the adjusting of the hardening depth by adjusting e.g. the used AC frequency.

The trailing edge may be quenched after hardening, and may be subsequently tempered.

During the hardening, the trailing edge may initially be hardened to a deeper depth, and may subsequently be ground down until the hardening depth is in the range 0.02-1.5 mm.

DETAILED DESCRIPTION

Figure 1:
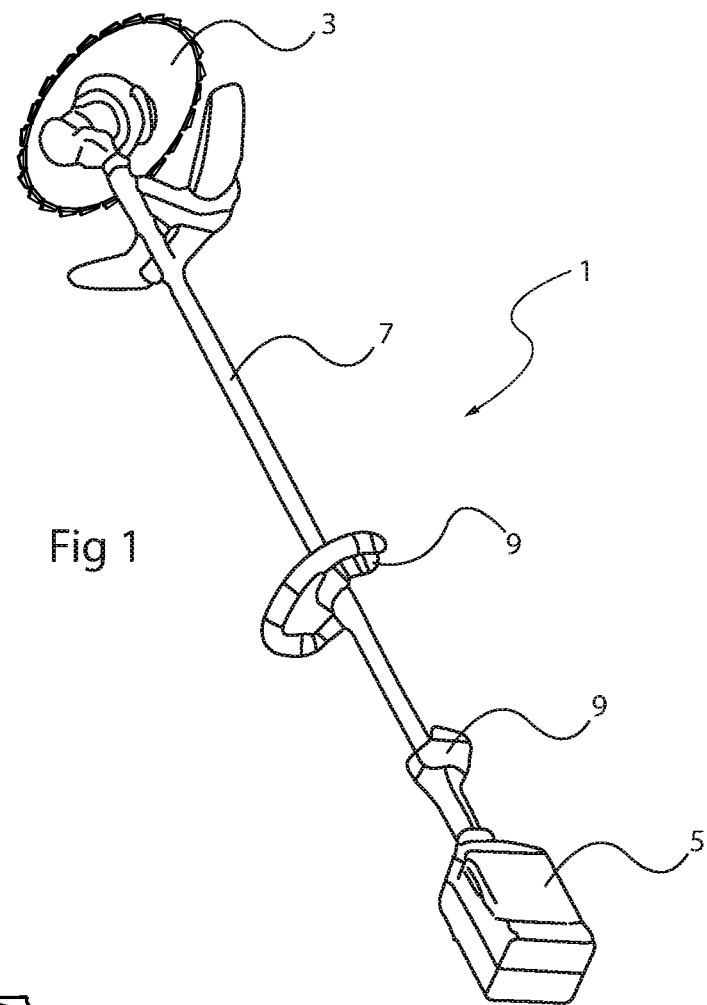
FIG. 1 illustrates schematically a clearing saw or brush cutter.

The present disclosure relates generally to a cutting blade 3 for a clearing saw 1 or clearing cutter as schematically illustrated in FIG. 1. Such a clearing saw 1 is carried by a single user, often by means of a harness (not shown). The clearing saw 1 comprises a motor 5, which may be an electric motor or a combustion engine, and drives the rotating cutting blade 3 by means of a drive shaft hidden in a shaft tube 7. Typically, handles 9 are attached to the shaft tube 7 for maneuvering the clearing saw 1.

Figure 2:
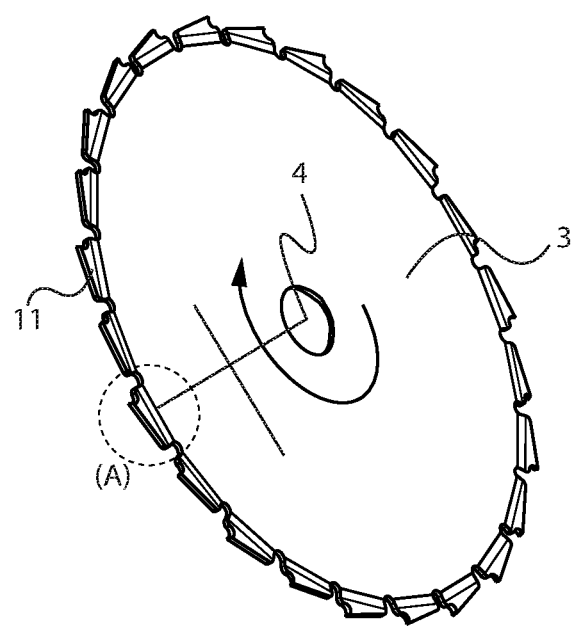
FIG. 2 shows a cutting blade.

FIG. 2 shows a cutting blade 3 intended to be used with a clearing saw 1. The blade comprises a blade hole 4 for connecting the blade to the clearing saw 1. A plurality of teeth 11 are formed around the periphery of the cutting blade 3. In the illustrated example, the cutting blade 3 has a generally circular outer shape, although this is not necessary. Other configurations are possible within the scope of the present disclosure. Typically, and as indicated in FIG. 2 (arrow), the cutting blade may have a dedicated direction of rotation, which also defines the cutting direction for the individual teeth of the blade.

Figure 3:
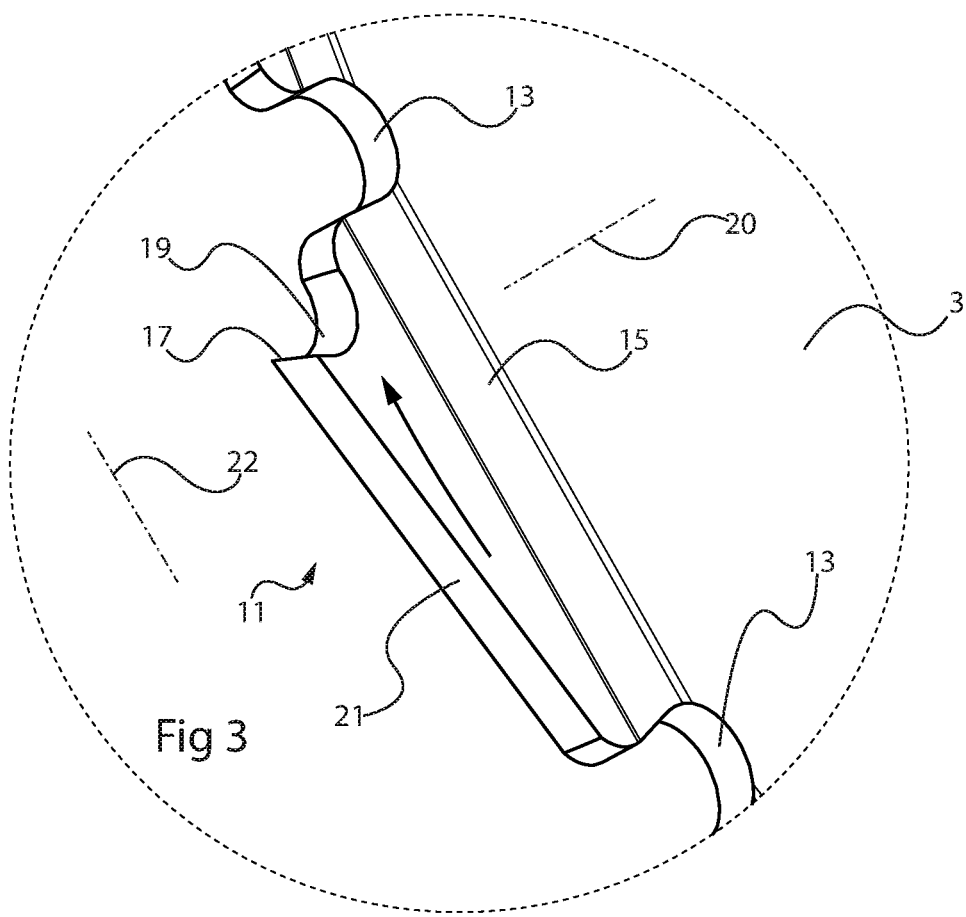
FIG. 3 shows enlarged a tooth of the cutting blade in FIG. 3.

FIG. 3 shows enlarged a tooth 11 of the cutting blade at (A) in FIG. 2. In the illustrated example, all teeth are more or less identical although this is not necessary.

The teeth 11 may as illustrated be separated by intervening cut-outs 13 providing dents in between the teeth 11. This facilitates bending each tooth 11 or some of the teeth at a bend 15, which makes the tooth project slightly out of the plane of the center piece of the cutting blade 3. That is to say, the blade generally extends in a plane, and said at least some of the teeth 11 are set out of this plane. This may improve the blade function and for instance prevent the blade from becoming stuck in a thick branch or the like during use. As the different teeth 11 are bent about slightly different axes, the intervening cut-outs 13 facilitates this bending.

The tooth 11 has a point 17, which points in the direction the periphery of the blade 3 is intended to rotate during use. On one side of the point 17 there is provided a curved leading edge 19, which has a concave shape, facing in the peripheral direction of rotation. On the other side of the point there is provided a trailing edge 21 which is directed more in parallel with the direction of rotation. Typically, the direction of the leading edge 19 of the tooth defined as a straight line passing through the end points of the concave shape deviates less than 25° from the radial direction 20 of the blade. The trailing edge 21, which may be straight, typically deviates less than 10° from the peripheral direction 22 of the blade 3.

The concave shape of the leading edge allows this edge to be manually filed for instance with a 5.5 mm round file. This should preferably be done regularly during use to keep the blade sharp. This also means that the front end of the trailing edge reaches further towards the direction of rotation than does inner parts of the leading edge. The terms leading and trailing here refers to the order in which these edges appear along the periphery of the blade, and as a whole the leading edge will be located further to the front than the trailing edge as a whole. In the cutting blade 3 of the present disclosure, the trailing edge 21 of each or some of the teeth is hardened to a shallow depth by means of inductive hardening. At least the sub-portion of the trailing edge 21 that is closest to the point 17 is hardened, although it may be preferred to harden the entire trailing edge. This provides a cutting blade with improved durability and efficiency.

The leading edge 19 of the tooth is however substantially not hardened in this process, although at the point 17, some hardening from the trailing edge 21 will bleed through. The sheet metal from which the blade as a whole is punched may of course be initially uniformly hardened to some extent, but will in any case be softer than 590 HV (Vickers Hardness) which defines unhardened as used here. Typically, most of the leading edge 19 will be at a hardness of 430 HV or lower.

By a shallow depth is here meant a depth in the range 0.02-1.5 mm and more preferred within the range 0.02-0.5 mm. This depth of the length of the trailing edge 21 or the sub-portion thereof that is hardened where the structure of the material is affected by the hardening process can be confirmed by visual analysis with a microscope.

The hardening of the trailing edge 21 raises the hardness of the tooth at the surface, typically from 380-430 HV to 600-650 HV. This reduces wear on the cutting blade 3 to a great extent, and the hardened layer can be active during the entire life of the cutting blade. When hardening has been carried out, the blade can be quenched e.g. in an oil bath or a polymer emulsion as is well known per se. The blade may thereafter be tempered using the same equipment as used when hardening, but usually at a lower temperature.

If the blade has been ground before being hardened/tempered, that latter process can remedy deficiencies in the crystalline structure introduced as a result of the grinding.

It should be understood that the effect of the hardening decreases gradually from the surface of the trailing edge 21. The hardening depth is herein defined as the depth where the hardness has decreased to 590 HV.

As the leading edge 19 is left unhardened, and only a very thin piece of the leading edge 19, closest to the point 17, is affected by the hardening of the trailing edge 21, the leading edge 19 can be manually filed regularly after use of the blade 3 in order to keep the blade sharp.

As the hardening depth is shallow, the blade as a whole remains ductile enough to pass e.g. bending tests required according to safety regulations. A deeper hardening depth could make the blade brittle, and in a worst-case scenario a piece of the blade may break off and hit and injure a user or a bystander. The hardening allows a softer steel to be used for the blade as a whole. This makes it easier to punch the blade from a raw piece of sheet metal, providing lower manufacturing costs. Thanks to the use of a softer material, the teeth can also be manually set during use, if desired, with no or small risk of breaking.

Thanks to the shallow hardening depth and consequently a very small heated volume, the heated portion does not necessarily need to be quenched to obtain the desired metallurgic qualities. The non-heated adjacent parts of the blade quickly lead away the heat thereby cooling the hardened portion. However, active quenching may still be preferred depending on the used material and the thickness of the blade, for instance.

One suitable material for the blade is a medium to high carbon content carbon steel, such as DIN 17222-Ck75.

Figure 4:
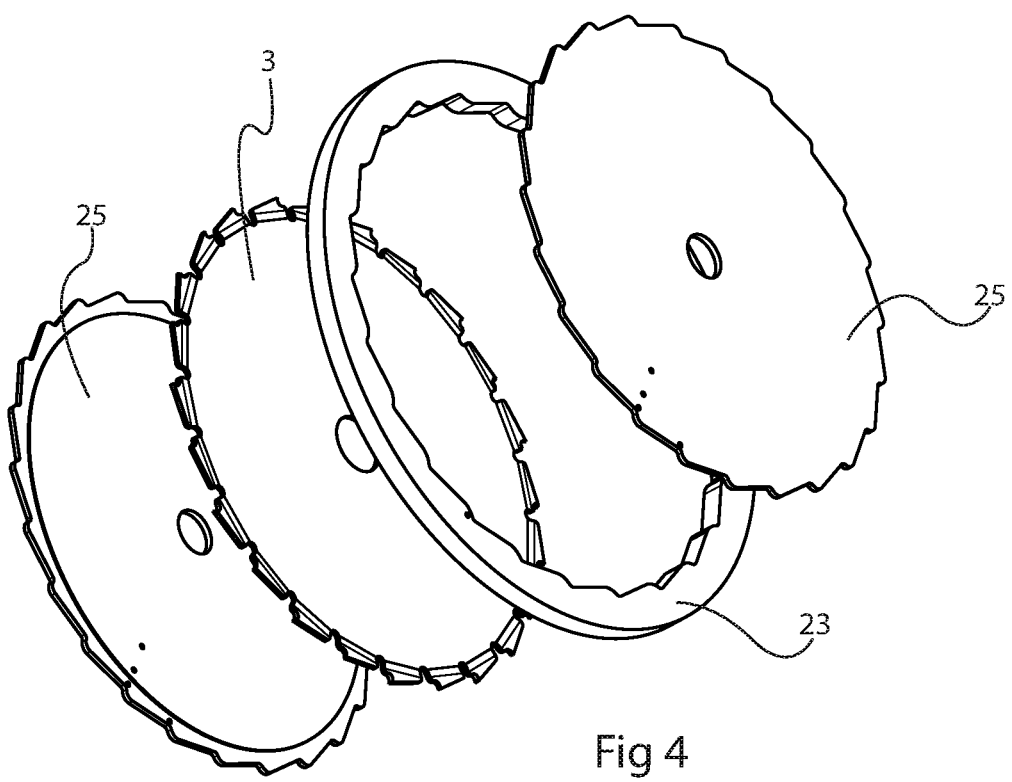
FIG. 4 illustrates, in an exploded view, devices used for induction hardening of a cutting blade.

Induction hardening may be used to harden the trailing tooth edge. FIG. 4 illustrates in an exploded view an arrangement used for induction hardening of a cutting blade 3. The inductive heating may be provided by a circumferential inductive head 23, which is capable of heating all teeth 11 simultaneously. However, other configurations are possible that harden for instance one tooth at a time. The blade 3 may be sandwiched between two shielding layers 25 that aid with concentrating the inductive magnetic field to heat the trailing edge radially inwards.

The inductive head 23 may comprise a connector, such as a rectangular cross-section copper tube, which may be cooled by an inner fluid flow to maintain low temperature despite the considerable currents it conveys. Such means for induction hardening are known per se. Needless to say, other possible configurations exist.

The inductive head may be driven, for instance, with an 2.6 kA (rms) alternating current at 130 kHz for 0.4 seconds to provide the desired hardening. These parameters however may need be adapted for other steel materials than the abovementioned carbon steel. Generally, the hardening depth will decrease with increasing frequency. Pre-heating at a lower current may precede the hardening.

The shielding layers 25 may comprise copper or another material with lower resistivity than steel.

After hardening, it is possible to lower the blade into a bath for quenching, and it is possible to subsequently move the blade back to provide tempering for a longer period using the same inductive head 23, which is then driven to re-heat the blade to a lower temperature as compared with the temperature of the hardening step.

Figure 5:
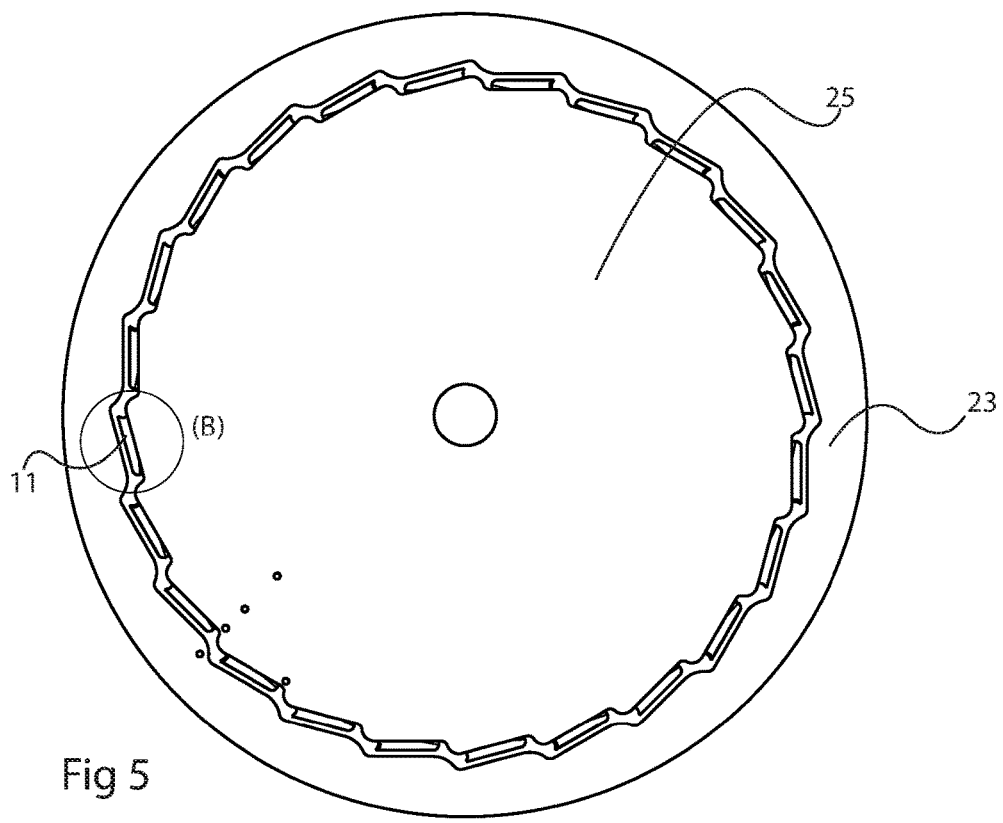
FIG. 5 shows a front view of a blade being hardened.
Figure 7:
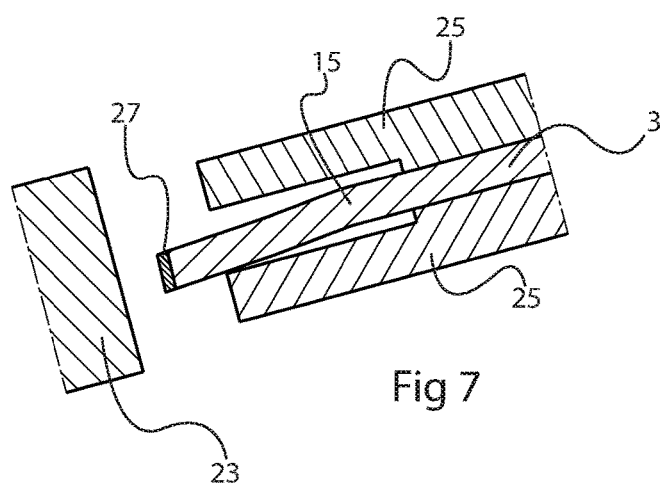
FIG. 7 shows a cross section C-C indicated in FIG. 6.
Figure 6:
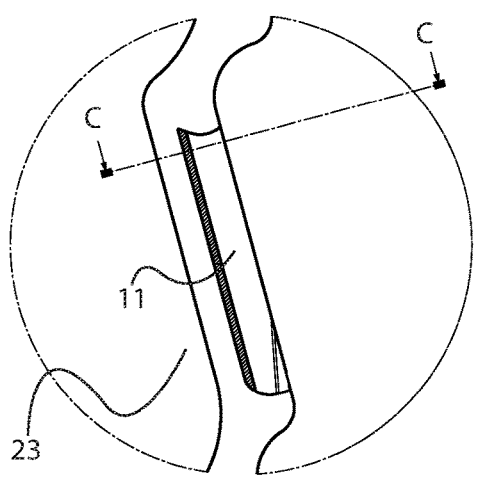
FIG. 6 shows a part of FIG. 5 enlarged.

FIG. 5 shows a front view of a blade being hardened with the setup in FIG. 4. FIG. 6 shows a part with a tooth 11 of FIG. 5 enlarged, and FIG. 7 shows a cross section C-C indicated in FIG. 6. In FIG. 7 the hardening depth 27 in the trailing edge of the tooth 11 is indicated.

Another option to achieve the desired hardening depth is to initially harden the trailing edge to a deeper depth, and subsequently grind the edge until the hardening depth is in the desired range, e.g. 0.02-1.5 mm.

The present disclosure is not restricted to the examples above and may be varied and altered in different ways within the scope of the appended claims.

The invention claimed is:

1. A cutting blade for a clearing saw, the cutting blade comprising a plurality of teeth, wherein at least some of said teeth comprise a leading edge, a trailing edge, and a point in between the leading edge and the trailing edge, wherein
the trailing edge is inductively hardened to form a hardened surface having a trailing edge depth in a range of 0.02-1.5 mm by an inductive ring head, wherein a hardness of the trailing edge decreases from a surface of the trailing edge to 590 HV at the trailing edge depth, and
the leading edge is not subjected to the inductive hardening except at said point.

2. The cutting blade according to claim 1, wherein the trailing edge depth is in a range of 0.02-0.5 mm.

3. The cutting blade according to claim 1, wherein the leading edge is concave and faces a dedicated circumferential direction of rotation of the cutting blade.

4. The cutting blade according to claim 1, wherein adjacent teeth of the plurality of teeth are separated by intervening cut-outs.

5. The cutting blade according to claim 1, wherein a tooth of the plurality of teeth comprises a bend that directs the tooth out of a plane of the cutting blade.

6. A method for producing a cutting blade for a clearing saw, the cutting blade comprising a plurality of teeth, the method comprising:

providing at least some of said teeth with a leading edge, a trailing edge, and a point in between the leading edge and the trailing edge, inductively hardening the trailing edge by an inductive ring head to form a hardened surface having a trailing edge depth in a range of 0.02-1.5 mm, wherein a hardness of the trailing edge decreases from a surface of the trailing edge to 590 HV at the trailing edge depth, and not subjecting the leading edge to inductive hardening.

7. The method according to claim 6, wherein the trailing edge is quenched after hardening.

8. The method according to claim 7, wherein the at least some of said teeth are subsequently tempered.

9. The method according to claim 6, wherein the trailing edge depth is in a range of 0.02-0.5 mm.

\* \* \* \* \*